United States Patent
Más Ivars

(10) Patent No.: US 8,214,870 B2
(45) Date of Patent: Jul. 3, 2012

(54) METHOD AND ARRANGEMENT FOR IMPROVED CHANNEL SWITCHING

(75) Inventor: Ignacio Más Ivars, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 413 days.

(21) Appl. No.: 12/600,603

(22) PCT Filed: Jun. 4, 2007

(86) PCT No.: PCT/SE2007/050397
§ 371 (c)(1),
(2), (4) Date: Nov. 17, 2009

(87) PCT Pub. No.: WO2008/150204
PCT Pub. Date: Dec. 11, 2008

(65) Prior Publication Data
US 2010/0154013 A1 Jun. 17, 2010

(51) Int. Cl.
*H04N 7/173* (2011.01)
(52) U.S. Cl. ............ 725/110; 725/90; 725/94; 725/95; 725/97; 725/100; 370/390; 709/228; 709/229; 709/231; 709/232

(58) Field of Classification Search ............... None
See application file for complete search history.

(56) References Cited

U.S. PATENT DOCUMENTS

| | | | |
|---|---|---|---|
| 2007/0250890 A1* | 10/2007 | Joshi et al. | 725/120 |
| 2008/0112315 A1* | 5/2008 | Hu et al. | 370/230 |
| 2010/0043034 A1* | 2/2010 | Li et al. | 725/87 |

* cited by examiner

*Primary Examiner* — Dominic D Saltarelli
*Assistant Examiner* — Jason J Chung

(57) ABSTRACT

In a method of providing a channel/client status register to enable improved channel switching in an Internet Protocol network with a plurality of client nodes each capable of receiving video sessions over a plurality of channels from at least one video provider system, initially arranging S1 said plurality client 5 nodes into an associated group. A first client node, upon switching to or joining a new channel, transmitting S2 a channel update message to said associated group, said channel update message comprising an identity of said first client node, an identity of said new channel and a topological indication for said channel. Subsequent providing and updating S3 a respective channel/client 10 status register in each of said plurality of client nodes based on said transmitted channel update message, thereby enabling identification of what channels the client nodes in said associated group are associated with or viewing.

9 Claims, 6 Drawing Sheets

METHOD AND ARRANGEMENT FOR IMPROVED CHANNEL SWITCHING

TECHNICAL FIELD

The present application relates to Internet Protocol systems in general, and specifically to improved channel switching in such systems.

BACKGROUND

IPTV (Internet Protocol TV) is a term used when delivering broadcasted TV-services over an IP network, typically a broadcast access network. In addition, more personalized service can be delivered due to the flexible nature of an IP network, e.g. video-on-demand or other user specific service, which then are delivered over unicast IP streams to the end user. IP video systems are becoming a key feature in service providers triple play offerings towards residential and business customers. Offering acceptable channel switching time with reasonable picture quality is essential for customers adoption. The problem maps directly into keeping low delays both in the customer premises and within the network.

To begin decoding and constructing an image from the video stream a lot of information needs to be gathered from the stream, which only comes with a certain frequency. In particular, to start displaying the image of a new video feed, the decoder needs to wait until a so-called intraframe (for a MPEG-2 codec) or a Random Access Point frame (for a MPEG-4/H.264 codec) arrives in the video stream. Intraframes are the only frames in the media stream that contain enough information on themselves to reconstruct a complete image. They typically come with a periodicity of 0.5 to 5 seconds, depending on the encoding type.

Existing solutions use a combination of pull mechanisms to obtain the last intraframe transmitted in the video transmission (HTTP GET or other) from the video server or the closest access node, or different mechanism to deliver slightly time-shifted video streams, so that the time distance to receiving an intraframe gets heavily reduced. These solutions imply that the channel switching mechanism will only be able to show a static image until the next intraframe arrives and the video decoding can continue or that your bandwidth consumption grows with the number of time-shifted streams that you are making available at the access node (DSLAM or equivalent). If the time shifting occurs in the access node itself, the requirements on processing power and capabilities of the multiplexing access node gets greatly enhanced.

Consequently, there is a need for mechanisms for reducing the channel switching time.

SUMMARY

A general object of the present invention is to provide an improved media network.

Another object of the present invention is to provide improved channel switching in an IP media network.

A further object of the present invention is to enable reduced channel switching time in an IPTV network.

These and other objects are achieved according to the attached set of claims.

Basically, the present invention comprises a method of providing a channel/client status register to enable improved channel switching in an Internet Protocol network with a plurality of client nodes each capable of receiving video sessions over a plurality of channels from at least one video provider system, by initially arranging Si the plurality client nodes into an associated group, upon switching to or joining a new channel a first client node, transmits S2 a channel update message to said associated group, said channel update message comprising an identity of the first client node, an identity of the new channel and a topological indication for said channel, providing and updating S3 a respective channel/client status register in each of said plurality of client nodes based on said transmitted channel update message, thereby enabling identification of what channels the client nodes in said associated group are associated with or viewing.

Further, the present invention discloses a method of improved channel switching in an Internet Protocol network with a plurality of client nodes each capable of receiving video sessions over a plurality of channels from at least one video provider system, wherein each client node maintains a respective channel/client status register, and when a first client node switches to or joins a new channel, identifies S10 at least one second client node in the group associated with the new channel based on its associated channel/client status register, subsequently determines S11 a closest client node based on its identified at least one second client node and the topological indicator, requests S12 the closest client node to provide a latest received self contained media frame. Then, the first client node decodes and views S13 the new channel based at least on the received self contained media frame. Finally, the first client node further transmits S14 a channel update message to all other client nodes of said associated topological indication.

In addition, arrangements and devices for implementing the above mentioned method are disclosed in the subsequent detailed description.

Advantages of the present invention comprise enabling fast channel switching with a performance that can be adjusted depending on the available bandwidth in the access network. The tradeoff between available bandwidth and desired end user channel switching time can be tweaked by modifying the TTL value of the channel announcement messages. The higher the value, the more receivers that will be able to use the client as a source of I-Frames, and the more channels that will populate the channel tables.

BRIEF DESCRIPTION OF THE DRAWINGS

The invention, together with further objects and advantages thereof, may best be understood by making reference to the following description taken together with the accompanying drawings, in which.

ABBREVIATIONS

IP Internet Protocol
IPTV IP TeleVision
STB Set Top Box
QoS Quality of Service
DSL Digital Subscriber Line DSLAM DSL Access Multiplexer
RG Residential Gateway
IGMP Internet Group Management Protocol
GW GateWay
P2P Peer-to-Peer
I-frame Intraframe
RAP Random Access Point
MPEG Moving Picture Experts Group

DETAILED DESCRIPTION

The present invention will be described with reference to the IPTV system illustrated schematically in FIG. 1. Although the invention is described in the context of an IPTV system, it is equally applicable to a Mobile TV for providing media/video content to mobile terminals or personal computers. In addition the invention is described with reference to a MPEG-2 codec where Intraframes are provided at regular intervals. However, the same method can be applied to a MPEG-4/H-264 codec where the frame instead is a Random Access Point frame. Those two types of frames will be referred to as self-contained frames in that they are compressed frames that does not depend on any previous or subsequent frames to be decoded and/or decompressed.

Figure 1:
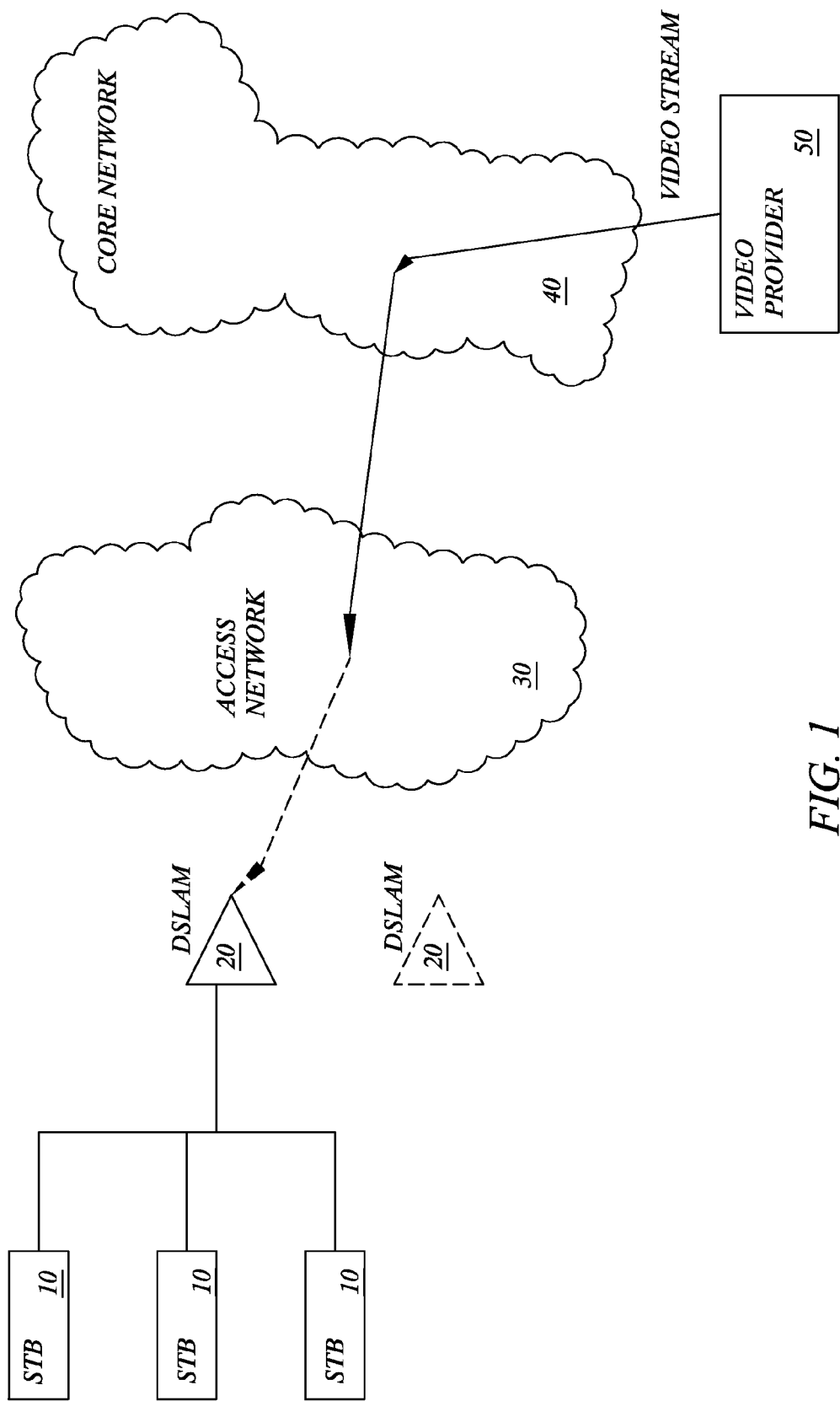
FIG. 1 is a schematic block diagram of an IP system in which the present invention can be implemented.

A brief description of the different parts of the system in FIG. 1 is given below.

The IP system comprises, among other things not shown, a plurality of users or clients associated with a respective set top box (STB) 10. These STB:s can be represented by STB:s within one or several buildings or some other geographical area. Further, the system comprises one or more Digital Subscriber Line Access Multiplexer (DSLAM) devices 20 to which the various STB:s 10 are associated. The DSLAM devices 20 delivers media content from the network to the users/clients over DSL:s. The DSLAM 20 can typically be IGMP-aware or non-IGPM aware. An IGMP aware DSLAM 20 has the ability to copy existing multicast traffic automatically to a new subscriber or client when the channel is subscribed to. It should also have the ability to terminate the multicast stream properly when the channel subscription ends. A non-IGMP aware DSLAM 20 simply passes through-IGMP requests and multicast traffic back and forth to and from the network. Further, the system comprises a wideband area network 30 and an associated core network 40, through which one or more video/media servers 50 provide broadcasted video/media streams to the various users.

The various devices of the above described IP system is only one example of such devices. It is evident that the devices can be exchanged for corresponding devices with the same or similar functionality. Therefore, the depicted DSLAM can be replaced with a device belonging to any other suitable access technology, for example Ethernet, fiber, WLAN, or UMTS. With an Ethernet connection in the home, the DSLAM would be an Ethernet switch, or with WLAN you would have a WLAN base station. In essence the suggested DSLAM could be replaced with any suitable layer 2 (link layer) switching device.

The basic idea of the present invention is to create a peer overlay of users watching IPTV in the system, which overlay is used to deliver missing frames i.e. intraframes or RAP-frames needed to decode a first received frame when an IPTV client switches to or joins a new channel.

In general, see details in [1], channel switching comprises a plurality of consecutive steps or actions in order to allow a client or user to switch to a new channel. When the user initializes a channel switch by pressing a button on the remote control (or the STB itself) to change the channel a number of steps typically take place before a new video feed actually can be displayed on a screen associated with the clients STB 10.

A channel change signal is transmitted or sent to the clients STB 10

The STB 10 issues a IGMP leave request to the old group (channel) and an IGMP join request to the new group (channel).

The residential Gate way (RG) sees the IGMP join and if the new channel already exists (i.e. someone in the same house is watching the same channel) simply copies it to the STB 10 otherwise it forwards the IGMP upstream. If the RG is not IGMP aware the IGMP join is simply forwarded.

The access node (e.g. DSLAM) receives the IGMP request and acts in the same way as the RG: if it is IGMP aware checks whether the multicast feed is already there, (someone in the neighborhood is watching that channel) and then copies the channel to the new port, or otherwise it forwards the IGMP join upstream.

The procedure is repeated for the aggregation router, which checks again if the channel is already being received. If it is not, then it forwards the IGMP join towards the distribution router, where the streams are always present.

Finally, when reaching the network point where the channel multicast feed exists, it is forwarded to the STB over the different nodes, which update their multicast tables to reflect the existence of that multicast feed.

One of the critical things needed for an IPTV system to work is the buffering of packets in the STB:s 10 to remove jitter imposed by the network. Consequently, each STB accumulates received data frames in a buffer until the buffer reaches a certain threshold, after which the decoding process starts. In addition, to be able to reconstruct an image, an intraframe needs to be received in the multicast feed.

Another important detail is that the old channel needs to be terminated to avoid consuming bandwidth. The procedure is similar to the IGMP join, but with an IGMP leave, which will be checked in all IGMP aware nodes and compared to a list of nodes receiving the old multicast feed, the multicast tree is pruned and the data is not copied downstream any longer. For the most recent versions of IGMP (version 3) the IGMP join/leave have been replaced with an IGMP membership report (IGMPv3 MR) which provides both the join and leave functionality within one single message.

In order to tackle the different components of the channel switching delay times, various different and complementary technical solutions are possible. IGMP setup delay can be improved by having the multicast channels available as close as possible to the end user, but this causes more bandwidth consumption in the access network.

The main component that the present invention concerns and improves is the intraframe delay, i.e. the time it takes to receive a first intraframe of the new channel that can be used to decode the media stream. The schematic illustration in FIG. 2 shows a typical encoding scheme of video streams using MPEG-2, however also other coding schemes comprising similar frames e.g. RAP-frames are possible e.g. MPEG-4 etc.

Figure 2:
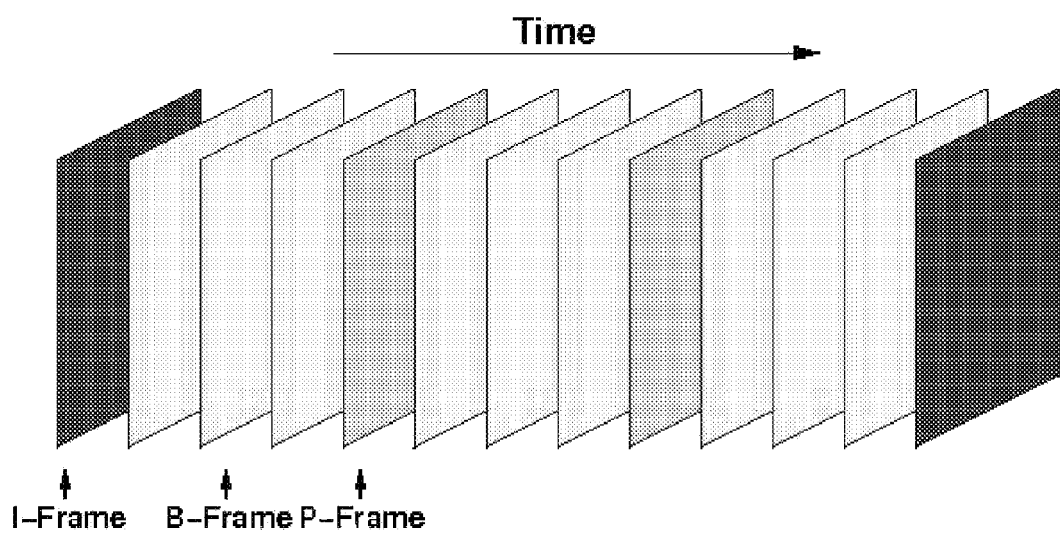
FIG. 2 is a schematic illustration of a general media stream comprising a plurality of sequential frames.

As seen in the FIG. 2, for a MPEG-2 codec the media stream comprises various types of frames, P-frames, B-frames and Intraframes, Intraframes are marked as "I-frame". The I-frame is the only frame where there is no reliance on previous or future frames for coding. The coding is done on only the I-frame itself so there is only intraframe coding used. Thus, it useful when an error has been introduced in the frame sequence as it restores the correct frame again. The P-frame is coded using prediction of the previous P-frame or I-frame. This prediction is usually accomplished by means of motion compensation and motion predication. The last type of frame is the B-frame that is a frame that is coded by means of forward and backward prediction to I-frames and P-frames, or even an estimate of the in between value of them. This type of frame is susceptible to propagating errors but has the advantage of a low bitrate.

Two parameters are important in the encoded video/media stream, the video resolution, e.g. 1920×1080 pixels for HDTV, and the intraframe frequency, e.g. one every five seconds (roughly). Both parameters affect the bandwidth requirement of the encoded channel. The resolution also affects the perceived user quality when the stream is decoded, while the intraframe frequency gives the delay until it is possible for the client STB to start decoding the frames in the media stream when switching to or joining a new channel.

As mentioned earlier, the present invention is based on the concept of creating or forming a peer-to-peer (P2P) overlay of users watching IPTV (pr Mobile TV for that matter). The overlay is used to deliver missing self contained frames e.g. intraframes from the last transmitted I-frame until the first frame received by an IPTV client changing channel. In this manner, when a user changes channel, the IPTV client performs the IGMP join for the new channel and starts receiving frames from the multicast group/channel. At the same time, the client requests the missing I-frames based on a channel table stored in memory and built by using the information transmitted in the P2P overlay.

The present invention is based on the concept of providing and updating a client/channel status register at each client node in an associated group i.e. peer-to-peer overlay. And, on how each client node maintains and utilizes its client/channel status register when joining or switching to a new channel.

Figure 3:
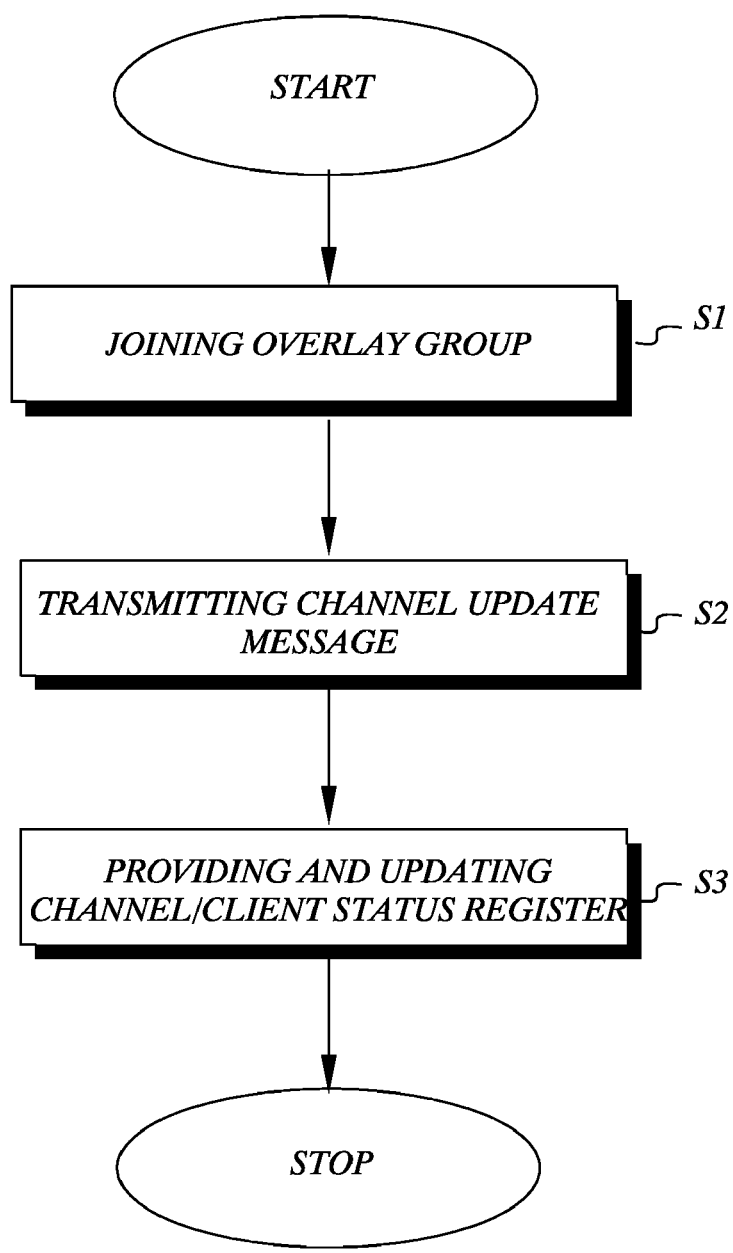
FIG. 3 is a schematic flow diagram of an embodiment of a method according to the present inventions.

With reference to FIG. 3, an embodiment of a method of providing and updating a channel/client status register at a client node will be described.

Consider an Internet Protocol network (as illustrated by FIG. 1) comprising a plurality of client nodes receiving or at least being capable of receiving media or video sessions over a plurality of channels from a video provider. Initially, the client nodes or a sub-set of the plurality of client nodes are arranged S1 into an associated group (such as a broadcast group, multicast group or peer-2-peer (P2P) overlay), as indicated by the dotted box surrounding the client nodes.

When one of the client nodes in the associated group joins or switches to a new channel (according to known methods and not described in detail herein) it transmits S2 a channel update message to the other client nodes in the associated group. The message contains the identity of the client node, the identity of the new channel, and a topological indicator for the client. The topological indicator comprises information enabling the other clients to determine the distance to the client node.

According to one embodiment, the topological indicator provides information concerning the geographical location of the client node and enables the client nodes to determine their respective distance to the other client nodes. One such geographical indicator could be geographical coordinates provide by a General Positioning System (GPS). Another potential geographical indicator could give an indication of the number of network hops between each client node.

According to a further embodiment, the topological indicator provides information concerning the time required for transmission between two client nodes. This could typically be implemented by means of a timestamp, such as a Time To Live (TTL) value. Another possible timestamp could be implemented by performing the additional step of synchronizing all client nodes in the associated group to a common clock, such as a Network Time Protocol. In that manner, the channel update message comprises a timestamp for the client node, and upon receipt of the channel update message each client node can determine the transmission time from the updated client node.

Upon receipt of a channel update message, each client node provides and updates S3 a respective channel/client status register based on the information contained in the channel update message. Thus, each client node in the associated group are aware of what client nodes are watching what channel, and what the distance (geographically or in time) to each other client node is.

In order to reduce the amount of data in the channel/client status register it might be necessary to apply some restrictions as to how and when the updating of the register is performed.

According to a specific embodiment, the register is only updated if the client nodes are within a predetermined topological distance from each other. For example, within a predetermined number of hops, a predetermined transmission time, a predetermined geographical distance etc. Thus it is might be necessary to perform a further step of comparing and checking the topological indicator to some predetermined criteria.

According to a further embodiment, the channel update message is only transmitted when the client node has been on the new channel for a predetermined minimum time. This is to reduce the huge number of channel update messages that would result if a client is zapping rapidly through many channels. Optionally, the channel update message is transmitted immediately, but the client node receiving the message only updates its register if a predetermined time interval has lapsed since the last update message from the same client node was received.

The above described method ensures that each client node in an associated group provides and updates a register comprising information about what client is currently viewing what channel, and how far away each client node is. The term currently is used in the sense that it is current for the client with the register. Since a client might have left the channel, lost connectivity or just turned off its receiving device, the register reflects what the situation was at that moment in time when the channel update message was sent.

Figure 4:
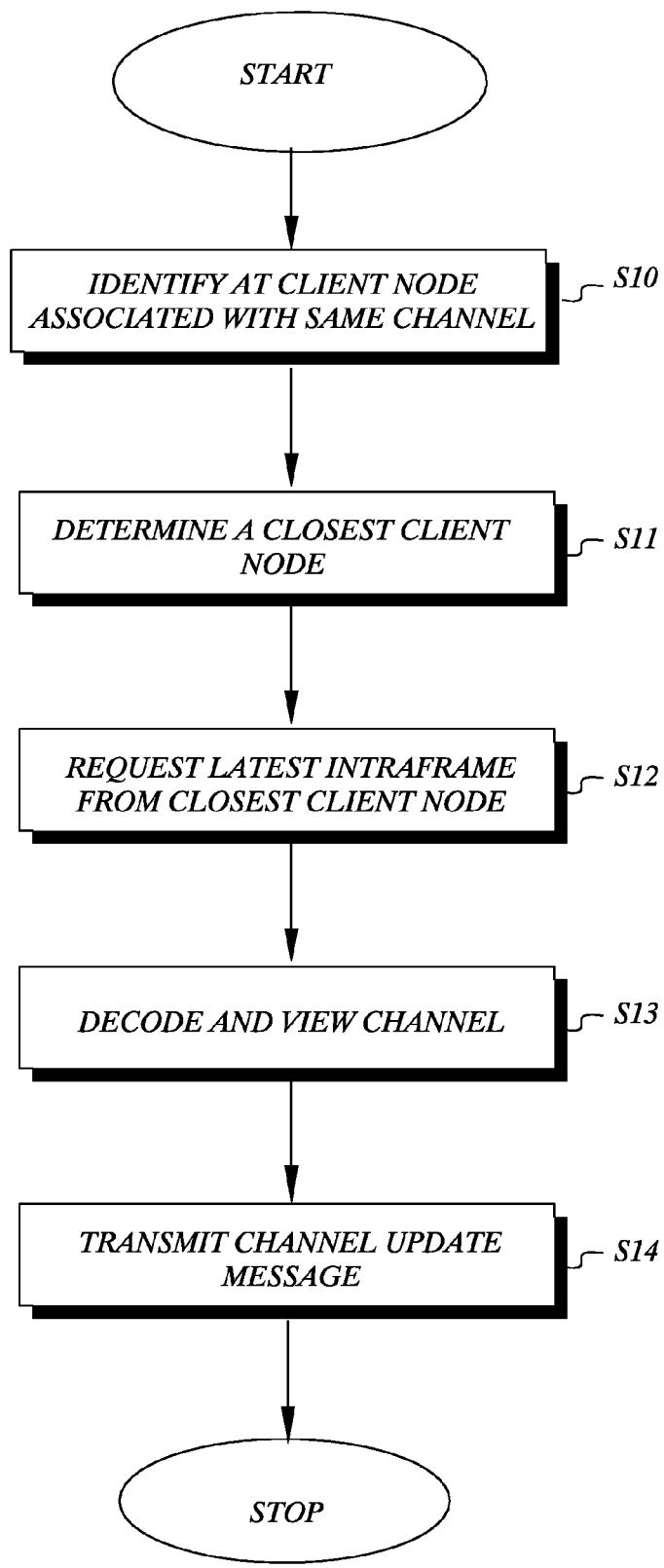
FIG. 4 is a schematic flow diagram of another embodiment of a method according to the present invention.

With reference to FIG. 4, an embodiment of a method of utilizing a provided and updated channel/client status register upon switching to a new channel will be described.

In an IP network (as illustrated by FIG. 1) a client node is configured to provide and update a channel/client status register as previously described. When the client node wishes to switch to or join a new channel it switches channel and receives the media frames according to known methods. However, in order to enable a faster start of the actual display of the content of the new channel, the client utilizes its register in the following manner.

The client node utilizes its register to identify S10 one or more client nodes in its associated group that are watching the new channel. Based on the identified one or more other client nodes the client node determines S11 which of the identified nodes is the topologically closest one, based on the topological indicator in the register for that client. Subsequently, the client node sends a message to the closest client node requesting S12 the latest received self-contained media frame e.g. Intraframe for the new channel. Then, the client decodes and views S13 the new channel based on the received intraframe. Finally, the client node transmits S14 a channel update message to its associated group comprising its identity, the identity of the new channel, and its topological indicator.

According to a specific embodiment, the intraframe request is a unicast message to the determined closest client node. However, although it would result in large amount of signaling and bandwidth consumption, it is also possible to transmit a multicast message to a plurality of client nodes associated with the same channel requesting the intraframe.

One aspect that might need to be taken into consideration is the occurrence that a determined closest client node is not responding to the frame request. This can be due to a loss of the request message itself, that the client node has left the channel and not yet sent a channel update message, or that the client for some reason has lost connection with the channel. In that case, a request may have to be sent to a second closest node. However, there is always a chance (or risk) that a next consecutive self contained frame or intraframe for the new channel already has been received by the client node (in the actual media stream from the channel), thus rendering a second request unnecessary.

According to a further embodiment, a client node determines if a maximum expected arrival of a next intraframe in the media stream is shorter or longer than the topological indicator for the closest client node and based on that determination decide if it is necessary to request an intraframe.

Figure 5:
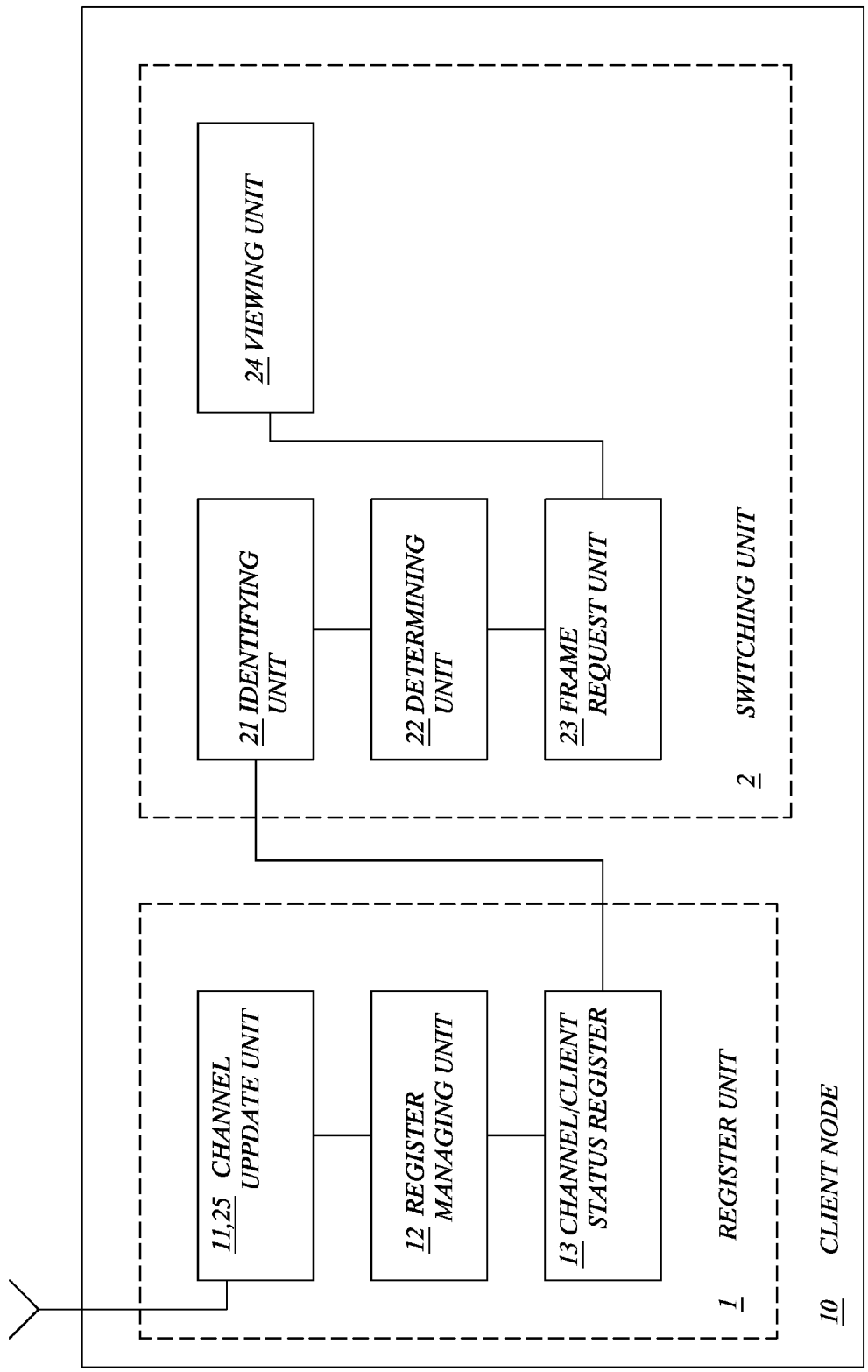
FIG. 5 is a schematic illustration of an embodiment of an arrangement according to the invention.

An embodiment of an arrangement 1 in a client node 10 according to the invention will be described with reference to FIG. 5.

As stated previously, a plurality of client nodes 10 in an IPTV network are arranged into an associated group. The arrangement 1 in a client node comprises a channel update unit 11 responsible for transmitting channel update messages to the other client nodes in the associated group when the client node 10 joins or switches to a new channel. In correspondence with the method of the present invention, the channel update message unit 11 is configured for providing information concerning the identity of the client node, the identity of the channel it has most currently joined, and a topology indicator for the client node. Further, the arrangement includes a unit 12 for receiving channel update messages from the other client nodes in the associated group and storing the information of the messages in a client/channel status register 13.

According to a further embodiment, an arrangement 2 in a client node 10 (in addition to the units of the previous embodiment) includes a unit 21 for enabling a client node that is switching to a new channel to identify one or more client nodes in its associated group that are currently viewing the same channel, based on its channel/client status register 13. Further, the arrangement 2 includes a determining unit 22 for determining which of the one or more identified client nodes that is topologically closest. In addition, the arrangement 2 includes a unit 23 for requesting a latest received self contained media frame or intraframe from the closest client node 10. The arrangement 2 also includes a unit for switching to, decoding and viewing the channel based on the received requested intraframe. Finally, the arrangement 2 comprises a unit 25 for transmitting a channel update message to the other client nodes in the associated group.

Preferably, the two above mentioned arrangements are co-located in a same client node. As such, it is evident from the FIG. 4 and FIG. 5 that at least the channel update unit 11, 25 and the register 13 are part of or at least utilized by both arrangements.

Figure 6:
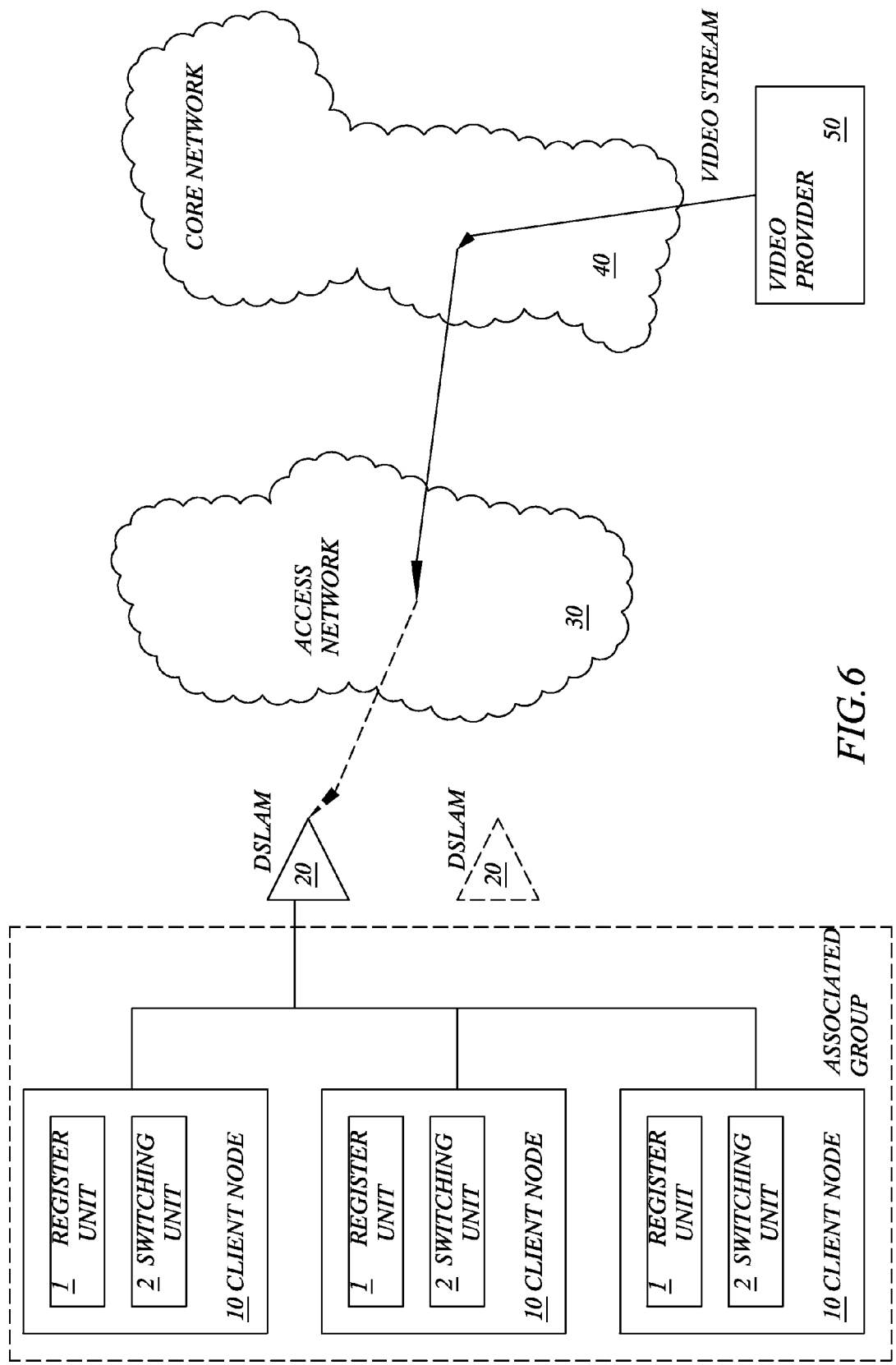
FIG. 6 is a schematic illustration of a system with the present invention implemented.

FIG. 6 illustrates the arrangements according to the present invention as implemented in a IPTV network similar to FIG. 1.

Although embodiments of the present invention have been described in the context of client set top boxes in an IPTV system, it is equally applicable to any IP connected device taking part in an IP media exchange, such as a personal computer, a mobile terminal etc. The arrangement of the client nodes according to the invention can be located in client set top boxes, as well as in a mobile terminal or personal computer.

The procedure in summary is as follows:

A plurality of active client STB:s are arranged to form an associated group, such as a broadcast group or P2P overlay.

When an IPTV client is initialized it joins the IPTV P2P overlay. Immediately it starts listening for channel announcements in the overlay. These announcements carry information of IPTV clients in the overlay watching other TV channels, along with their IP contact information and the topological distance to those clients.

Each client builds a table or register with all the channels it has seen announcements for and stores the information of the client watching each channel with its location information. The table is always updated with the client that has the shortest distance from the user's IPTV client.

When the user changes channel the IPTV client start receiving the frames from the multicast channel and it immediately sends a buffer request to the client stored in the table that is watching the same channel. The buffer request contains information about the first frame received (as a sequence number) and the location information of the user's client.

When the answer from the remove IPTV client arrives. It contains the last I-frame that the client needs to decode the arriving frames.

Finally, when some seconds have passed and the user has decided that it wants to stay in the current channel, the IPTV client sends a channel update broadcast message to the P2P overlay, informing of the current channel being watched. The broadcast message contains a low TimeToLive value, which limits the amount of traffic in the network and ensures that only clients close to the user's location will use the user's IPTV client as a source for missing I-frames Advantages of the present invention comprise enabling fast channel switching with a performance that can be adjusted depending on the available bandwidth in the access network. The tradeoff between available bandwidth and desired end user channel switching time can be tweaked by modifying the TTL value of the channel announcement messages. The higher the value, the more receivers that will be able to use the client as a source of I-Frames, and the more channels that will populate the channel tables.

It will be understood by those skilled in the art that various modifications and changes may be made to the present invention without departure from the scope thereof, which is defined by the appended claims.

REFERENCES

1. "Managing delay in IP video networks, Version 1.0", White Paper, Cisco Systems 1992-2005.

The invention claimed is:
1. A method of improved channel switching in an Internet Protocol network with a plurality of client nodes within a group, each capable of receiving video sessions over a plurality of channels from at least one video provider system, comprising the steps of:

each said client node maintaining a respective channel/client status register of other nodes wherein said channel/client status register maintaining identities of said other nodes, identities of channels that are being viewed by said other nodes, and topological indications for sad other nodes;

a first client node, upon switching to or joining a new channel, identifying at least one second client node in said group associated with said new channel based on a channel/client status register associated with sad at least one second client node;

determining a closest client node based on said identified at least one second client node and said topological indications;

requesting said determined closest client node to provide a latest received self contained media frame;

said first client node decoding and viewing said channel based at least on said received self contained media frame;

said first client node further transmitting a channel update message to all other client nodes of said associated topological indication.

2. The method according to claim 1, wherein said frame request comprising a unicast transmission to said determined closest client node.

3. The method according to claim 1, wherein said self contained frame comprises a compressed frame adapted to be decoded and/or decompressed independently of previously or subsequently received frames.

4. The method according to claim 3, wherein said self contained frame is an Intraframe in a MPEG-2 codec.

5. The method according to claim 3, wherein said self contained frame is a Random Access Point frame in a MPEG-4/H.264 codec.

6. The method according to claim 1, wherein determining said closest client by determining which client node associated with said new channel has the fewest number of hops from the first client.

7. The method according to claim 1, wherein determining said closest client by determining which client node associated with said new channel has the smallest time difference between its time stamp and the current time at the first client node.

8. A client node in an Internet Protocol system communicating with a plurality of other client nodes each capable of receiving video sessions over a plurality of channels from at least one video provider system, wherein said client node and the other client nodes are configured into an associated group, comprising:

means for transmitting a channel update message to said associated group upon a channel switch, said message comprising an identity of the client node, an identity of said channel, and a topological indication for sad client node;

means for receiving and storing channel update messages from other client nodes in a respective client/channel status register;

means for identifying, upon switching to a channel, at least one other client node in sad group associated with sad channel based on a channel/status register associated with said at least one other client node;

means for determining a closest client node based on said identified at least one other client node;

means for requesting sad determined closest client to provide a latest received self contained media frame;

means for switching to, decoding and viewing said channel based on said received self contained media frame; and means for transmitting a channel update message to the client nodes of said associated group, wherein the channel update message comprises an identity of the client node, an identity of said channel, and a topological indication of said channel.

9. A method for improving channel switching in an Internet Protocol network with a plurality of client nodes, each capable of receiving video sessions over a plurality of channels from at least one video provider system, wherein said plurality of client nodes are arranged into a group, comprising the steps of;

a first client node within said group, upon switching to a new channel, transmitting a channel update message to other client nodes within sad associated group, said channel update message comprising an identity of said first client node, an identity of said new channel and a topological indication for said channel;

updating a client status register in each of said plurality of client nodes based on said transmitted channel update message, thereby enabling identification of what channels the client nodes in said associated croup are viewing;

said first client node, upon switching to a different channel, identifying at least one second client node in said group viewing said different channel based on a client status register associated with said at least one second client node;

determining a closest client node based on said identified at least one second client node and said topological indicator;

requesting said determined closest client node to provide a latest received self contained media frame;

said first client node decoding and viewing said channel based at least on said received self contained media frame; and said first client node further transmitting a channel update message to all other client nodes of said associated topological indication.

* * * * *